UNITED STATES PATENT OFFICE.

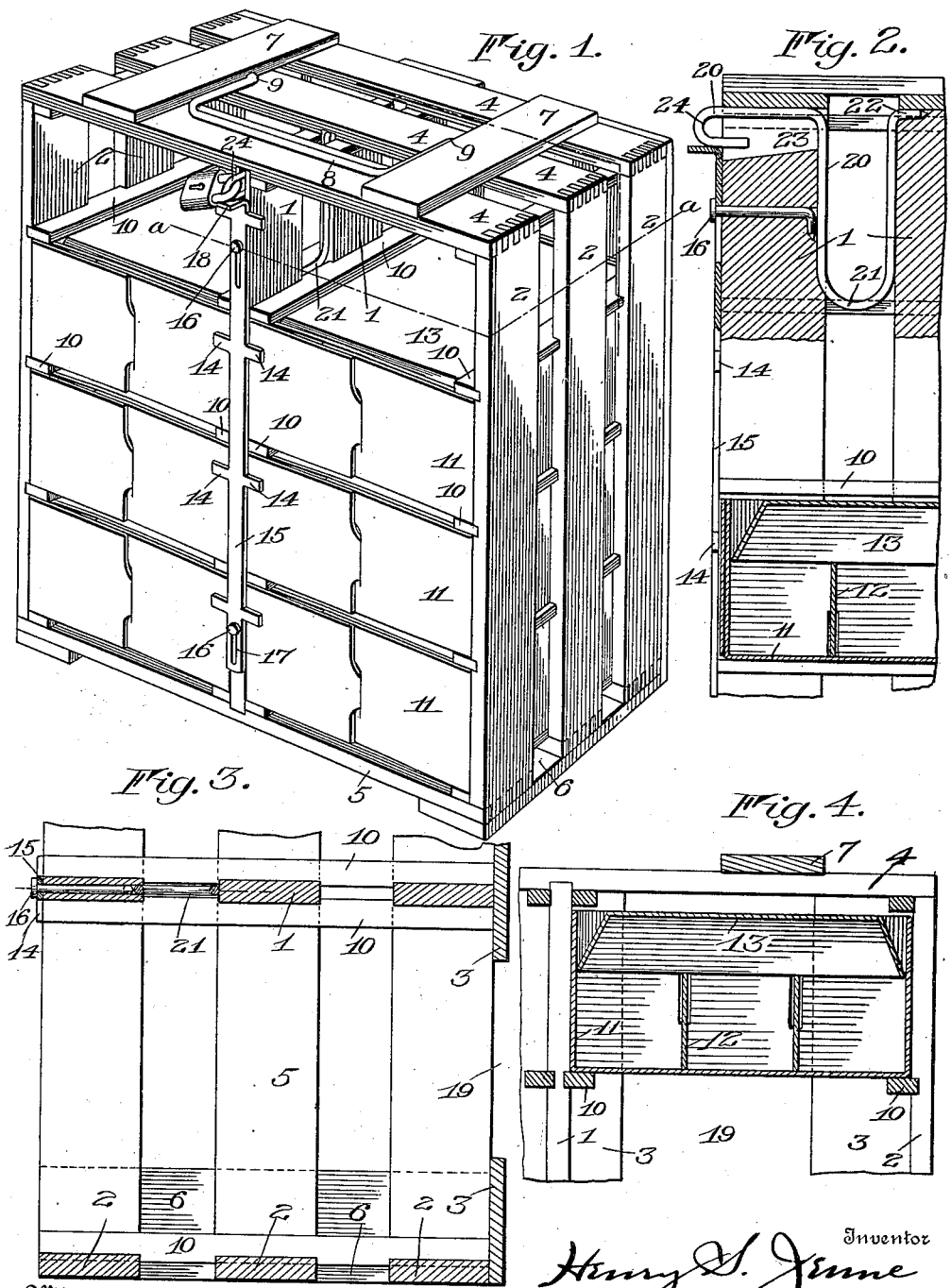

HENRY S. JENNE, OF ROCHESTER, NEW YORK, ASSIGNOR TO STAR EGG CARRIER & TRAY MFG. CO., OF ROCHESTER, NEW YORK, A CORPORATION OF NEW YORK.

EGG-CARRIER.

1,043,435.

Specification of Letters Patent. Patented Nov. 5, 1912.

Application filed February 8, 1909, Serial No. 476,768. Renewed April 19, 1912. Serial No. 691,834.

*To all whom it may concern:*

Be it known that I, HENRY S. JENNE, of Rochester, in the county of Monroe and State of New York, have invented certain new and useful Improvements in Egg-Carriers; and I do hereby declare the following to be a full, clear, and exact description of the same, reference being had to the accompanying drawings, forming a part of this specification, and to the reference-numerals marked thereon.

The present invention relates to egg carriers and it has for an object to provide a simple and inexpensive construction which may be employed by dealers in eggs for carrying a number of orders without liability of breakage.

Another object is to provide an improved locking means for a number of independently removable receptacles mounted within a single casing.

To these and other ends the invention consists in certain improvements and combinations of parts all as will be hereinafter more fully described, the novel features being pointed out in the claims at the end of the specification.

In the drawings: Figure 1 is a perspective view of a carrier embodying this invention with two of the egg holding receptacles removed for the purpose of providing a better illustration; Fig. 2 is a detail vertical section through the locking means and also through one of the egg holding receptacles;
Fig. 3 is a detail horizontal section on line *a—a* of Fig. 1, and Fig. 4 is a detail vertical section at right angles to the section shown in Fig. 2.

This invention contemplates a compact arrangement of a number of independently removable egg holding receptacles within a single portable carrier which permits individual orders to be separately delivered and protects the eggs against breakage during transportation. To this end, there is employed in the illustrated embodiment of the invention a casing having one wall preferably the front one open, and divided by a vertical partition or wall 1 into two chambers. This partition, the side walls 2, rear wall 3 and the top and the bottom walls 4 and 5, respectively, are formed by spaced strips in order to lighten the structure, the strips of the side walls having their ends connected to the strips forming the top and the bottom wall, and the strips of the vertical wall 1 having their ends connected to the top and the bottom strips. The strips of the bottom wall are connected by transverse strips 6 serving as supports for the casing, while the strips of the top wall are connected by transverse strips 7 to which may be secured a carrying device such as a bail 8 having outwardly deflected ends 9 turning beneath the said strips 7.

Through the open front wall of the casing may operate the egg holding receptacle which may be independently supported in the casing by strips 10 serving as guides for the receptacles to hold the latter in spaced relation. These strips extend transversely of the strips of side walls 2 and vertical partition 1 and are arranged in grooves in the same, thus serving also to hold the strips together.

The holding receptacles each embody a case 11 preferably made of card board or the like and divided by partitions 12 into cells for holding the eggs, all of said cells opening to an open side of the case whereby they may be discharged simultaneously when the receptacle is inverted. The cell forming partitions preferably do not extend to the top edge of the case in order that a separable or removable closure in the form of a tray 13 may fit loosely within the case above the cells and the receptacle may fit tightly the walls of casing 1 and between the guides 10 so that it will not move or vibrate within the casing during transportation. A further advantage for fitting the trays within the receptacles instead of on the outside is that the trays are permitted to be fitted to and removed from their receptacle with greater ease and thus with less liability of breakage to the eggs.

In order to prevent the receptacles moving from the casing during transportation there is provided a suitable locking means which preferably embodies a locking device for each receptacle movable toward and from the path of the latter. These locking devices may have a common controller and to this end are in the form of lateral projections 14 on a vertically movable slide bar 15 that is guided on the front of the casing preferably on headed pins 16 projecting from partition 1 of the latter and working in slots 17 in the bar. Adjacent projections in the present form are spaced apart on the bar a distance at least equal to the height of a receptacle so that the latter may pass between them when the bar is shifted, the projections then lying in the horizontal plane of the strips 10. The bar 15 is preferably made of sheet metal with the projections 14 integral therewith and the upper end is deflected forwardly to provide a finger piece 18.

The bar or controller 15 may be held against accidental movement by any suitable means but it is preferred to employ a latch 20 which may be moved transversely of the bar to coöperate with the upper end of the latter. The latch may be mounted in a slot or opening formed by a saw kerf in the forward strip of partition 1, and it may be pressed forwardly by a spring which in this instance is formed by a U-shaped loop 21 lying vertically between the first two strips of partition 1 and having one end secured to the latch and the other end secured to the second strip by a deflected portion 22. That arm which is secured to the latch lies in a groove 23 in the rear face of the forward strip, while the bend of the loop lies in the plane of the strips 10 supporting the upper receptacles, thus preventing the loop being accidentally engaged and moved from operative position. To release the controller bar, the latch 20 is pressed out of the path of the bar which may then be raised, and when raised the forward end of the latch bears with friction against the rear face of the bar and holds the latter in its adjusted position.

The latch may be locked against movement by any suitable means, but it is preferred to employ an eye 24 at its forward end so that a padlock may be secured thereto to to prevent the inward movement of the latch. The locking of the latch makes it possible to employ the carrier as a crate for shipping eggs from the farmer and saves handling by third parties except upon delivery.

In operation the receptacles are filled with different orders and are introduced into the casing with the tray closures in position thereon. The locking means is now operated to hold them in the casing while the casing is carried to the different destinations of the orders. In delivering an order a receptacle is removed and inverted with its tray upon a flat support so that when the receptacle is again elevated the eggs will be discharged into the tray. In removing the receptacles from the casing the rear ends of the former are engaged by a hand introduced through the openings 19 formed in the casing in proximity to the rear ends of the receptacles, the openings in this instance being provided by the spaces between the strips forming the rear wall of the casing. This arrangement facilitates the removal of the receptacles without adding the cost of knobs or other pulls to the several receptacles.

A carrier constructed in accordance with this invention insures dealers in eggs against breakage in transportation and permits the compact assemblage of a number of orders. The structure for effecting this result is light in weight and inexpensive to manufacture, it being possible to make the egg holding receptacles of cardboard or other light inexpensive material and they are protected against accidental blows by being housed by the carrier casing.

I claim as my invention:

1. The combination with a casing, of receptacles slidably mounted within the casing, locking devices for the receptacles, a slide operating the locking devices and a spring pressed latch mounted independently of the slide and movable transversely of the path of the latter to engage the same and hold it in locking position and also to engage the side of the same to hold it in unlocking position.

2. The combination with a casing having a vertical partition formed of strips spaced apart, the forward strip being slotted, guides in the casing, and removable receptacles movable on the guides, of a slide movable on the vertical partition, projections on the slide to coöperate with the receptacles, and a spring pressed latch operating transversely of the path of the slide in the slot of the forward strip.

3. The combination with a casing having a vertical partition formed of strips spaced apart, the forward strip being slotted, guides in the casing, and removable receptacles movable on the guides, of a slide movable on the vertical partition, projections on the slide to coöperate with the receptacles, a latch arranged in the slot of the forward strip and a vertically arranged U-shaped spring lying between the first two strips of the vertical partition and having one end secured to the latch and the other end secured to the second partition.

HENRY S. JENNE.

Witnesses:
 RUSSELL B. GRIFFITH,
 HAROLD H. SIMMS.

Copies of this patent may be obtained for five cents each, by addressing the "Commissioner of Patents, Washington, D. C."